No. 733,932. PATENTED JULY 21, 1903.
J. ANDERSON.
MACHINE FOR DISTRIBUTING POISON ON COTTON OR OTHER PLANTS.
APPLICATION FILED APR. 19, 1902.
NO MODEL. 2 SHEETS—SHEET 1.
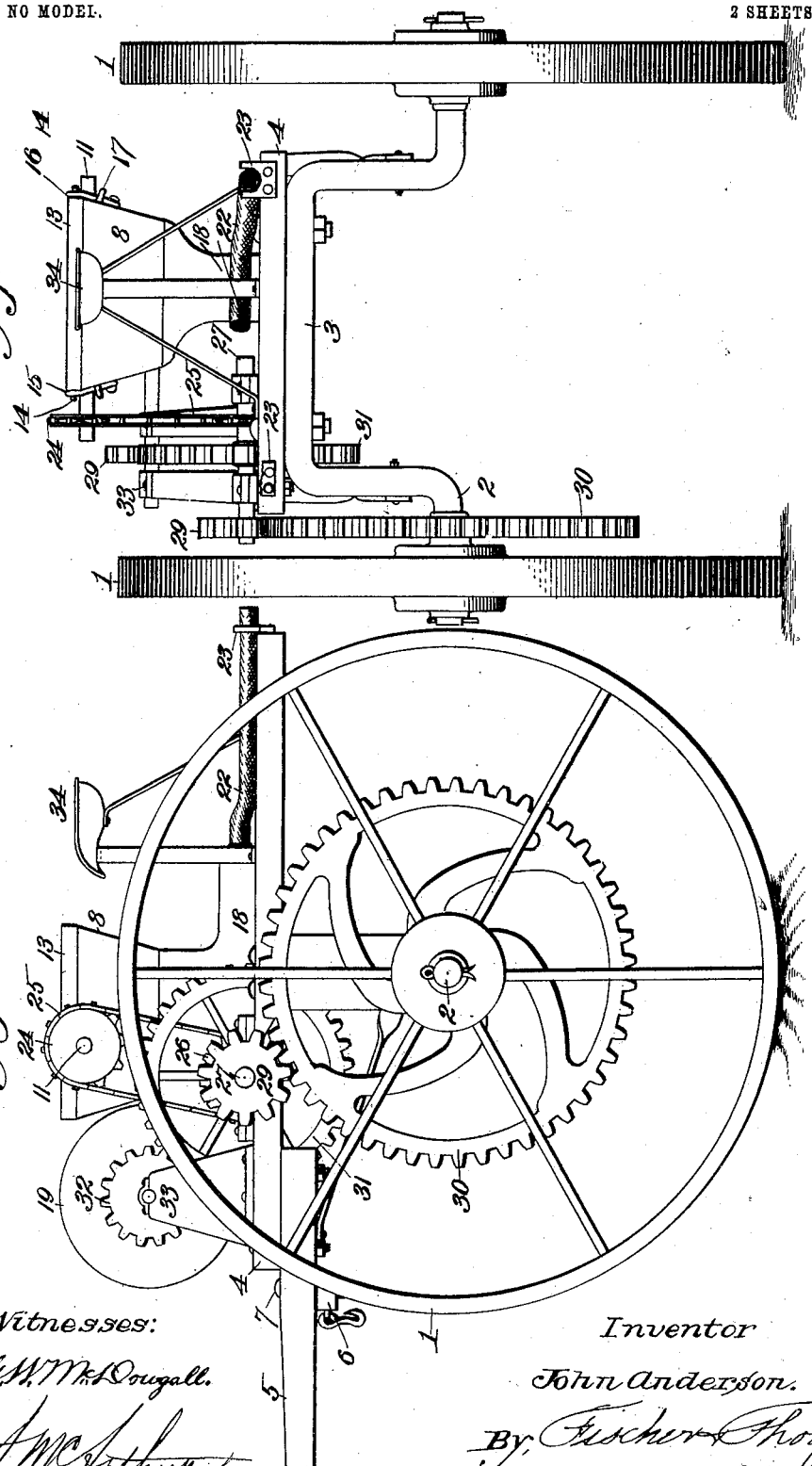

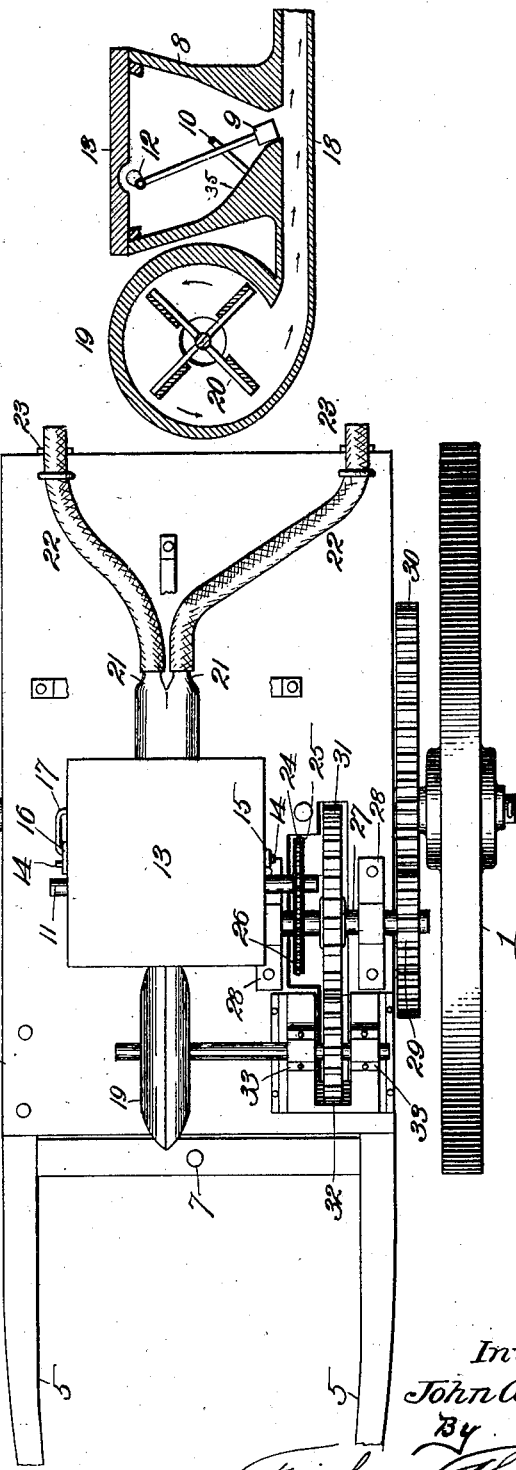

No. 733,932. Patented July 21, 1903.

UNITED STATES PATENT OFFICE.

JOHN ANDERSON, OF LEXINGTON, MISSOURI, ASSIGNOR OF ONE-HALF TO FRANK STRANDBERG, OF LEXINGTON, MISSOURI.

MACHINE FOR DISTRIBUTING POISON ON COTTON OR OTHER PLANTS.

SPECIFICATION forming part of Letters Patent No. 733,932, dated July 21, 1903.

Application filed April 19, 1902. Serial No. 103,730. (No model.)

*To all whom it may concern:*

Be it known that I, JOHN ANDERSON, a citizen of the United States, residing at Lexington, in the county of Lafayette and State of Missouri, have invented certain new and useful Improvements in Machines for Distributing Poison on Cotton or other Plants, of which the following is a specification.

My invention relates to poison-distributing machines, and more especially to machines for distributing poison on cotton or other plants to kill and drive away the bugs and germs which infest and work great injury to such plants, and thus materially diminish their product; and my object is to produce a machine of this character which operates efficiently and reliably and which can be manufactured and sold at a reasonable price.

With this object in view the invention consists in certain novel and peculiar features of construction and combinations of parts, as hereinafter described and claimed, and in order that it may be fully understood reference is to be had to the accompanying drawings, in which—

Figure 1 is a side elevation of a machine for distributing poison embodying my invention. Fig. 2 is a rear view of the same. Fig. 3 is a top plan view of the same. Fig. 4 is a vertical longitudinal section taken through the hopper containing the poison and the fan for distributing the poison as it is expelled from the hopper.

Referring now to the drawings, where like reference characters designate corresponding parts in all the figures, 1 designates the carrying-wheels of suitable size—say about three and one-half feet in diameter—journaled upon the opposite ends of axle 2, the latter being provided centrally with an arch 3, so that it may easily pass over the plants being operated upon.

4 designates a platform bolted or otherwise secured upon said arch and provided with forwardly-projecting shafts 5, to which a horse is adapted to be hitched in the usual manner, a whiffletree 6 being pivoted, as at 7, to the usual cross-bar, connecting the shafts near their rear ends. Mounted upon the platform at a suitable point is a hopper 8, having a narrow exit, and reciprocating in the exit is a plunger 9, guided through a loop 10 and pivoted at its upper end to the short crank 12 of a shaft 11, journaled in the upper part of the hopper. Said crank has sufficient throw and stands at a proper position relatively to the narrow exit to cause the plunger to first rise, so as to permit a charge of the powder to pass beneath it and then descend with force into the exit, nearly closing the latter and obviously delivering the charge of powder into the conduit. This construction I have found indispensable to the successful operation of a machine of this character employing an air-blast passing beneath a hopper and crossing its exit-opening.

In order to insure the proper delivery of the charges of poison into the conduit, I provide the hopper-wall adjacent to the fan-casing with a rearwardly and downwardly inclined portion 35. Upon this inclined surface the plunger travels, thus delivering each successive charge obliquely into the conduit and in the general direction of the fan-blast. This arrangement prevents the powder being blown back into the hopper by the fan-blast, which would be likely to occur if the charges were not forced from the hopper obliquely into the conduit away from the fan. Moreover, the scraping of the plunger upon the incline prevents clogging of the powder upon this surface, and the angle of the opposite side precludes any danger of the powder becoming permanently deposited there.

13 designates a cover for the hopper, the same having pins 14 projecting from its opposite sides, one pin engaging a wire loop 15, secured rigidly to the side of the hopper, the other pin being engaged by a hook 16, pivoted to the hopper and retained in a loop 17, also secured thereto.

Arranged vertically and centrally below the hopper and communicating with and leading past the exit-passage thereof is a conduit 18, and communicating with the front end of said conduit is a fan-casing 19, in which is mounted a rotary fan 20 of the usual or any preferred type, the arrangement being such that the air taken in the fan-casing is blown rearwardly through conduit 18, together with the charge of poison forced down into the conduit by plunger 9.

The conduit terminates in two nozzles 21 at its rear end, and coupled as shown or in any other suitable manner to said nozzles are tubes 22, which project slightly beyond the rear end of the platform and are secured, preferably, in the notched plates 23, secured to the rear end of said platform. As tubes 22 point directly to the rear they discharge the powder in a narrow belt behind the moving vehicle and preclude any danger of the horses and driver becoming injured by contact with the cloud after the apparatus has been turned at the end of a field. Inasmuch as the powder which I use in my distributer is very destructive to the hair of animals it is apparent that this precaution is very necessary.

The crank-shaft 11 is provided with a sprocket-wheel 24, connected by chain 25 with a larger sprocket-wheel 26 on shaft 27, journaled in bearings 28, secured to the platform, which shaft 27 is provided with a pinion 29, driven by the master-gear 30, journaled on axle 2 and secured rigidly to the contiguous drive-wheel in any suitable or preferred manner. Said shaft 27 also transmits motion at the required speed to the fan by means of a large gear-wheel 31, which extends through a slot in the platform, and a small pinion 32, journaled on the fan-shaft, the latter being mounted in bearing-standards 33 or otherwise.

In operation the driver occupies the seat 34 in advance of the distributing-tubes 22, so that there will be no possibility of the powdered poison used blowing toward and being inhaled by him with injurious results. As the machine proceeds across the field with the wheels traveling at opposite sides of the row of plants the gearing described imparts rapid movement to the fan and to the plunger, the action of the plunger being needed to positively force the powder down into the conduit, where the strong blast created by the fan forces it rearward and distributes it widely and uniformly upon the plants.

From the above description it will be apparent that I have produced a machine for distributing poison upon cotton or other plants which possesses the features of advantage enumerated as desirable and which is of simple, strong, and durable construction. It is to be understood that while I have illustrated and described the preferred form of construction I am aware that it may be modified in various particulars without departing from the principle and scope or sacrificing any of the advantages of the appended claims.

Having thus described the invention, what I claim as new, and desire to secure by Letters Patent, is—

1. In an insecticide-powder distributer, the combination with a fan-casing having a horizontal air-conduit and a rotary fan in said casing, of a hopper mounted upon and having a narrow opening into said conduit, said hopper being provided with an inclined inner surface leading from the wall thereof adjacent to the fan-casing obliquely downward to said opening and away from said fan-casing, and a plunger traveling upon said inclined surface and adapted to force successive charges of poison into the conduit at an acute angle to the direction of the air-blast.

2. In an insecticide-powder distributer, the combination with a fan-casing having a horizontal air-conduit and a rotary fan in said casing, of a hopper mounted upon and having a narrow opening into said conduit, said hopper being provided with an inclined inner surface leading from the wall thereof adjacent to the fan-casing obliquely downward to said opening and away from said fan-casing, a plunger traveling upon said inclined surface and adapted to force successive charges of poison into the conduit at an acute angle to the direction of the air-blast, and a guide-loop to confine the movement of said plunger to said inner surface.

In testimony whereof I affix my signature in the presence of two witnesses.

JOHN ANDERSON.

Witnesses:
SAML. J. ANDREW,
GORDON WHITE.